United States Patent
Cubbedge

(10) Patent No.: US 6,935,045 B2
(45) Date of Patent: Aug. 30, 2005

(54) EXTENDIBLE TAPE MEASURE FINGER GUARD AND MARKING ASSIST

(76) Inventor: Phil Eugene Cubbedge, 1165 St. Rd. 206, St. Augustine, FL (US) 32086

(*) Notice: Subject to any disclaimer, the term of this patent is extended or adjusted under 35 U.S.C. 154(b) by 0 days.

(21) Appl. No.: 10/356,013

(22) Filed: Feb. 3, 2003

(65) Prior Publication Data
US 2004/0060188 A1 Apr. 1, 2004

Related U.S. Application Data
(60) Provisional application No. 60/414,215, filed on Sep. 30, 2002.

(51) Int. Cl.[7] .............................. G01B 3/10; B43L 7/00
(52) U.S. Cl. ............................... 33/770; 33/668; 33/42
(58) Field of Search ....................... 33/755, 757, 758, 33/759, 760, 768, 769, 770, 668, 42

(56) References Cited

U.S. PATENT DOCUMENTS

| | | | |
|---|---|---|---|
| 2,651,843 A | * | 9/1953 | Goodford .................. 33/27.03 |
| 2,795,050 A | * | 6/1957 | Van Fleet .................... 33/757 |
| 3,262,211 A | * | 7/1966 | Beckett ........................ 33/668 |
| 3,336,678 A | * | 8/1967 | Chamberlain et al. ........ 33/668 |
| 4,827,622 A | * | 5/1989 | Makar ......................... 33/770 |
| 4,890,393 A | * | 1/1990 | St. Jean ....................... 33/768 |
| 5,113,596 A | * | 5/1992 | Meyers ........................ 33/770 |
| 5,134,784 A | * | 8/1992 | Atienza ........................ 33/668 |
| 5,295,308 A | * | 3/1994 | Stevens et al. ............... 33/770 |
| 5,406,711 A | * | 4/1995 | Graham ......................... 33/42 |
| 5,782,007 A | * | 7/1998 | Harris .......................... 33/768 |
| 5,829,152 A | * | 11/1998 | Potter et al. .................. 33/668 |
| RE36,887 E | * | 10/2000 | Goldman ...................... 33/760 |
| 6,510,622 B2 | * | 1/2003 | Laughlin et al. ............. 33/770 |
| 6,763,603 B2 | * | 7/2004 | Carrabino .................... 33/770 |
| 2001/0042315 A1 | * | 11/2001 | Dixon ......................... 33/758 |

* cited by examiner

Primary Examiner—Diego Gutierrez
Assistant Examiner—Madeline Gonzalez

(57) ABSTRACT

A device for attachment to a retractable tape measure is provided which functions as a finger guard and a measurement index either fixed or moveably attached to the tape storage case or measurement tape. A measurement index or scoring feature is provided to insure accurate and repeatable measurements directed perpendicularly to the direction of tape extension.

4 Claims, 1 Drawing Sheet

EXTENDIBLE TAPE MEASURE FINGER GUARD AND MARKING ASSIST

This application claims the benefit of Provisional Application No. 60/414,215, filed Sep. 30, 2002.

BACKGROUND OF THE INVENTION

This invention is directed toward the field of measurement, marking, and scoring (or cutting) as practiced in professions such as sewing, carpentry and metalworking. It is very important to achieve accurate and repeatable measurement with minimum potential injury to the person making the measurement. More specifically, this invention is related to the field of encased, extendible and self-retracting tape measuring devices.

U.S. Pat. No. RE 36,887 is incorporated into this application by reference and is directed toward the safety and accuracy issue. U.S. Pat. No. RE 36,887 describes an extendible tape measure where a finger guard and marking assist is provided for situations where the tape measure is used to slide along a surface during measuring and/or marking. A marker holder assist is described at the hook or zero end of the tape, but it does not provide for the variable dimensions of markers in its design and marker dimension must therefore be compensated in use of the marker holder assist. A measurement index is a line perpendicular to the direction of extension of the tape which is easily referenced to a series of measurement markings on the tape. No provision of a measurement index or marking assistance located at the measured distance along the tape is mentioned.

U.S. patent application 20010042315 for an extendible tape measure is incorporated into this application by reference and is directed toward providing a measurement marker assist on the zero end of the tape for sliding measurements with compensation for the thickness of a standard size pencil or marking device, but does not provide a finger guard.

Tape measuring devices with digital readouts and printed indicia are known and are included in the background for this invention.

There is still a need for an extendible tape measurement device to provide for finger protection and marking/scoring accuracy assistance. The point where this is most needed is near the exit point of the tape from the case. The reference point or points of measurement provided by this invention in respect to the extended tape will be called a measurement index throughout this application.

SUMMARY OF THE INVENTION

In order to improve repeatability, accuracy, and safety in the mechanical trades, an attachment for an extendible tape measure is provided which comprises guarding for a finger, at least one measurement index, and at least one marking or scoring device holder. The attachment may be used either as attached to the tape housing, removably mounted on the tape housing of the extendible tape, or slidably mounted on the measuring tape. The attachment will provide at least one marking assistance edge related to a marking index, and one location for either a marking instrument holder and/or a scoring instrument holder, also related to a marking index. The measurement index related to the marking edge is designed to permit accurate marking of the workpiece in a direction perpendicular to tape extension. Likewise, the measurement index related to the scoring instrument is designed to permit accurate scoring of the workpiece in a direction perpendicular to tape extension. A marking instrument holder or marking point locator at the zero or hook end of the tape may also be provided. The measurement index and finger guard may be on the same part. Finger guarding is provided by the physical structure of the device being used in a position between the finger and the workpiece being measured or scored.

DETAILED DESCRIPTION OF THE INVENTION

Extendible tape measures are in common use for carpentry, mechanical construction and sewing to give representative examples. They are used to determine or mark distances upon something which will be called a workpiece. They commonly consist of a case from which the tape is mechanically extended and rewound, a hook or zero end, and measurement markings along one or both sides. The common metal or composite tape is usually curved in a direction perpendicular to its extension in order to provide stiffness upon extension and is commonly from about 0.5 to 1.5 inch wide. Markings are usually placed upon the upwardly curved face of the tape to indicate distance. Some tapes are marked on both sides, one side in inches and feet, the other side using a metric scale. The case is usually just wide enough to provide for tape and rewinding mechanism storage. The measurement index is usually not present or just assumed to be the point where the tape exits the case and current designs do not provide width for an accurate mark perpendicular to the tape extension direction. This invention describes a measurement index as an edge or line provided on a surface to reference location of a measured length on a measuring tape and/or a surface horizontally perpendicular to said measuring tape designed to facilitate marking or scouring of said measured distance. The lack of a fixed horizontal surface against which to run either a pencil like or knife like device often results in slanted marks which impair good measurement or cutting. The zero index or hook end of a measuring tape also usually does not provide for accurate mark location. The zero end often does provide compensation for inside/outside measurements. When the tape measure is extended and used to slide along the edge of a piece upon which work is being done, it is uncommon for there to be any finger protecting provisions made. A finger guard is a surface approximately vertically perpendicular to the tape extension direction against which the finger rests during a measurement.

Figure 1:
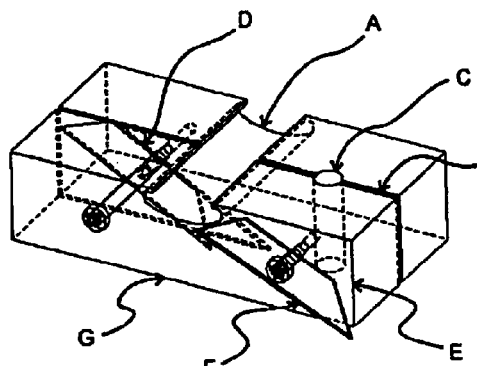
FIG. 1 shows a finger guard measurement index locator device designed to be removably attached to a measuring tape and movable along the tape as required. The perspective used is to show some representative interior detail. A shows a tape slot with a "D" configuration to match the curve and width of the tape to be used. B shows one central measurement index which is aligned with the center of the marking instrument holder shown at C and the scoring knife holder slot shown at D. E shows one vertical edge of the device, the height of which contributes to finger protection. F is another position where a scoring tool may be attached. The device edge at G may be used as marking edge and has width perpendicular to the tape extension. The back side of the device behind A serves as a finger guard. The top side of the device may also serve as a finger guard.
Figure 2:
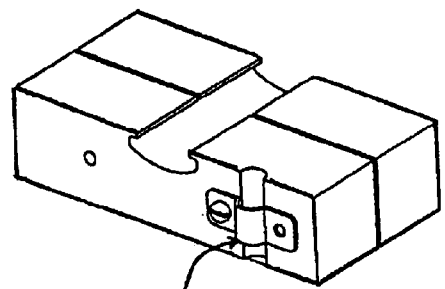
FIG. 2 shows a vertical half cylindrical slot at H for a marking instrument holder which may have a retaining clip as shown. The slot for holding the central cutting tool is beneath the central measurement index line. Attachment means for the cutting tool could be by a screw or its equivalent represented by the hole shown on the left front side of the device.
Figure 3:
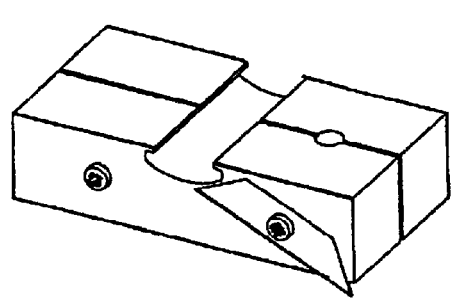
FIG. 3 shows the device with a cutting instrument attachment on the front edge and a central pencil holder.
Figure 4:
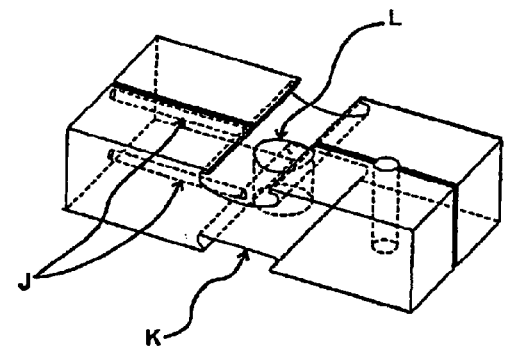
FIG. 4 shows an optional lower tape holding slot at K. Provision for a retaining mechanism for the tapes could be inserted at the locations shown by J. The central hole indicated by L provides for observation of the tape measurement markings in reference to the central measurement index.
Figure 5:
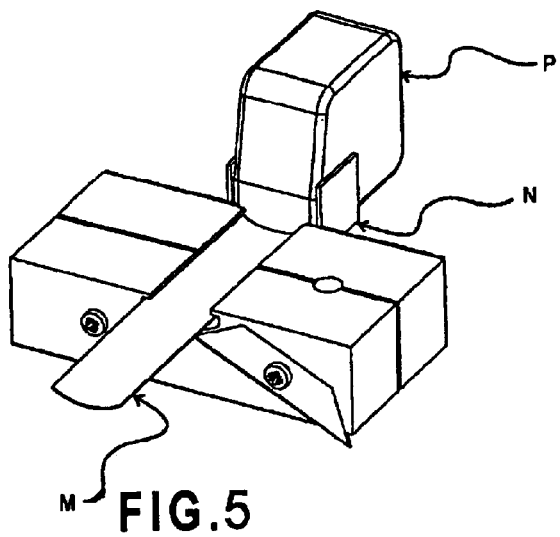
FIG. 5 shows the device with the tape shown by M mounted to a tape case P by clip N.

This invention provides a device having a measurement index and finger protection device designed to slidably attach onto the measuring tape with provision for intermittent fixation on the tape. More than one slot for the tape may be provided. Optionally, marking and/or scoring device holders may be provided. Fixation may be provided by friction, spring, elastic or mechanical means. One system for fixation can use the flexibility of the tape and a resilient material in the tape holding slot to provide friction. A system requiring only finger pressure to free the device to slide is preferred. The device may be constructed from many materials, but plastic such as vinyl or one of the polyolefins or styrene based polymers are preferred, with metal used for springs or wear surfaces as one option. There will be an opening in the finger guard/measurement index for mounting onto the metal tape on one side of the device, the opening curved on its lower edge to match the stiffening curve of the tape and the opening optionally having inwardly projecting lips at its upper edge to hold the device onto the tape. When the tape is being moved along a workpiece perpendicularly to the direction of tape extension, either the upper or back edge of the device will serve as a finger guard by coming between the finger and the workpiece. The front edge of the downward projecting surface of the device perpendicular to the tape extension will serve as one measurement index mark on the device upper surface. Since one cannot mark the workpiece easily below the tape, the device will be designed to provide some horizontal distance aligned with the measurement index perpendicular to tape extension for scribing a mark on the workpiece. Another option is to provide a hole in the slideable device where a marking or scoring device may be used, being careful to ascertain that this hole is aligned with the measurement index in use. This option is illustrated by the central pencil hole in FIG. 1 or the front pencil holder in FIG. 3. The above description is not limiting as those skilled in the art may make changes to the mechanism to facilitate production or reduce costs.

A means to permit sliding and temporary fixation on the tape during measurement will be provided. This may be accomplished by the shape and fit of the slot into which the tape is placed or by more elaborate mechanical designs, The term slot is intended to convey the idea of a shape through which the tape can slide, and is not restricted to a cutout form. A clip mounted upon the device could serve the same purpose. This will be called releasably slidable for this patent application. Said device will provide guarding of the user's finger from the workpiece and provide a measurement index perpendicular to the measuring tape with provisions for marking or scoring of the workpiece.

For the use where the intent is to score a material, a cutting edge may be mounted into the device in either a fixed cutting position or movably mounted to locate into and out of cutting position. The cutting edge may be placed to coincide with the measurement index, or for reasons of convenience, have its own easily read and set measurement index.

The device in one of its simple forms could be have as its base form a rectangular form 1.0 in. by 1.25 in. by 4.0 inch with at least one D shaped notch passing perpendicularly from one 1 inch by 4 inch side to the other on the upper edge with the curve of the D facing downward. The D shaped notch would be designed to fit and contain the measuring tape and would preferably have retaining projections into said notch's upper edge. A measurement index would be provided on at least one edge of the 1.25 by 4.0 inch surface. A slot for a scoring tool may be provided in the center of said 0.75 by 4.0 inch surface and a second measuring index provided on this surface to allow easy setting of the cutting distance. The scoring tool may be designed to be mounted so as to use the same index as indicated for marking, but safety and simplicity could be compromised. When the edge of the device facing the zero index of the tape is used to slide along the workpiece, the opposite edge will serve as the finger guard. This description is illustrative only and not limiting since several ways to achieve the result with different sizes could be just as effective.

For material savings, the device may be constructed with hollow areas provided that the requisite mechanical overall strength is not compromised.

Another aspect of this invention is the combination of a finger guard and measurement index removably, foldably or fixedly attached to the case of a tape measure. In use, this device will function much as described in the above description for a finger guard/measurement index described above, but it will be attached to the case of the tape measure while being used. Many forms may be contemplated, but a surface to slide along the workpiece to protect the finger and profiles to provide a measurement index while the device is being used comprises this aspect of the invention.

Attachment to the tape case, when such attachment may be desired, may be provided by a "C" shaped clip designed to snap upon the tape measure case and said "C" shaped clip having projections which frictionally or mechanically engage the finger guard/measurement index device. Other methods which accomplish the result of attaching the measurement index to the tape case are anticipated, with magnetic, mechanical as with a screw, or adhesive bonding as some examples.

The zero end of the tape may have a hole located in the tape surface at the zero mark for insertion of a marking or scoring device. This hole is preferably reinforced along its perimeter to have a thickness of about 1 mm.

It is not unexpected that an arrangement of two or more of said devices wirh measurement indexes could be attached to an extendible tape to provide a better repeatability of measurement between their locations on the tape and better finger protection than now provided by any system of extendible tape use now provided.

What is claimed is:

1. An attachment designed to facilitate measured marking and cutting while using commercially available extendable tape measures having a measuring tape which may be contained within or extended from a case; said attachment comprising:
    a) a substantially cubic body with a width greater than either its length or height;
    b) said width being within a range of one to eight inches;
    c) a slot positioned on an upper surface of said body, said slot sized and shaped to slideably hold said body of said attachment upon said extended tape, said slot being perpendicular to said width and height sides of said attachment;

d) retaining means on said body for sliding relocation and temporary fixation of said attachment upon said extended tape while said extended tape is located within said slot;

e) at least one measurement index located on the top surface of said attachment body and viewable relative to markings on said extended tape while in use;

f) at least one marking instrument holder and at least one cutting instrument holder built into said attachment body whose positions are known and fixed relative to said at least one measurement index; and g) said body further having guarding means for the hand and fingers, said body being designed to be easily hand held.

2. The attachment of claim 1 wherein said slot has a substantially D shape and is sized to closely fit the shape of commercially available extendable measuring tapes.

3. The attachment of claim 2 wherein a second slot is located near the lower width and length edge of said attachment body, said body having a view hole traversing the height of the body and located approximately upon the center of the upper width and length surfaces of said body, said view hole providing a view of said measuring tape markings relative to said at least one measurement index.

4. The attachment of claim 1 wherein the width edge of said attachment provides a marking edge arid said measurement index is perpendicular to said extended tape when said attachment body is connected to said extended tape.

* * * * *